M. A. STEVENS.
DENTAL IMPLEMENT.
APPLICATION FILED JUNE 13, 1918.

1,290,399.

Patented Jan. 7, 1919.

Witness
Edwin J Beller.

Inventor
M. A. Stevens,
by Wilkinson & Giusta.
Attorneys

UNITED STATES PATENT OFFICE.

MURRELL A. STEVENS, OF RUTLAND, VERMONT.

DENTAL IMPLEMENT.

1,290,399.  Specification of Letters Patent.  Patented Jan. 7, 1919.

Application filed June 13, 1918. Serial No. 239,790.

*To all whom it may concern:*

Be it known that I, MURRELL A. STEVENS, a citizen of the United States, residing at Rutland, in the county of Rutland and State of Vermont, have invented certain new and useful Improvements in Dental Implements; and I do hereby declare the following to be a full, clear, and exact description of the invention, such as will enable others skilled in the art to which it appertains to make and use the same.

The present invention relates to improvements in dental implements in general, and more particularly relates to a dental implement for use in assembling the separable parts of the handpiece of a dental engine.

Heretofore great difficulty has been experienced in putting together the separable members of a dental handpiece after the same have been disengaged in order to add the washers. The handpiece is subjected to a great amount of friction and becomes worn and washers have to be added from time to time. The difficulty in putting the members of the handpiece together arises from the fact that the spring which is carried by one of the members and which is adapted to engage with a rack bar carried by the other of said members and whereby the members are held together, has a tendency to strike parts of the member by which the rack bar is carried when the members are brought axially together, which prevents the further axial movement of the members to their final position; and before the members are permitted to be moved farther together the spring must be moved out of the way of the part encountered. This is now generally done by passing a rod through the slot in the handpiece and into engagement with the spring, but this is attended with a great deal of difficulty and requires the removal of the hand from one of the members of the handpiece.

I aim by my present invention to provide an improved implement which will grip one of the members of the handpiece and at the same time hold the spring in a retracted position where it will be out of the way of all projecting parts and which will be operable by one hand, leaving the other hand free to hold the opposite member of said handpiece.

It is an object of the present invention to provide a simple, readily operable, and cheap instrument for carrying out the above specified purposes.

In the accompanying drawings forming a part of this application, and in which similar reference symbols indicate corresponding parts in the several views.

Figure 1:
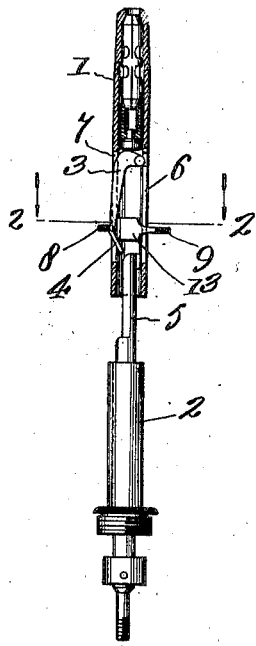
Figure 1 shows a vertical sectional view with parts in elevation of the members of a dental handpiece shown in separated condition about to be assembled, and showing certain parts in elevation and section of my improved implement.

Referring now in detail to the drawings wherein I have shown but a single embodiment of which my invention is susceptible, 1 and 2 designate the two opposite members of a handpiece of a dental engine, and 3 represents the spring carried by the member 1 and employed to hold the two members 1 and 2 together when assembled. As shown, this spring 3 has the crooked end 4 adapted to engage the teeth of a rack bar carried by the member 2, which rack bar is not shown in the drawings.

In assembling, the members 1 and 2 are brought axially opposite one another and moved longitudinally together so that the projecting reduced portion 5 on the member 2 may enter the hollowed out lower portion of the upper member 1. The entrance of the projecting portion 5 will be arrested by the crooked end 4 of the spring 3, which has a tendency to swing toward the right when unrestrained, and which forms an abutment against which the portion 5 will strike. It is the practice at the present time to remove the spring from the path of the portion 5 by passing a rod through the elongated slot 6 in the upper member 1 and thrusting such rod against the spring 3 to force it to a retracted position where it will project into and slightly beyond an elongated slot 7 made in the opposite side of the upper member 1, as shown in Fig. 1.

Figure 2:
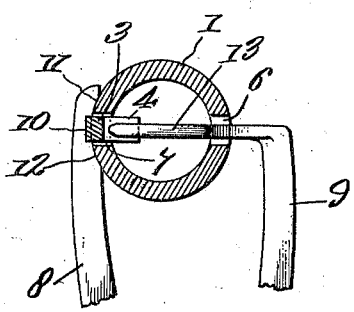
Fig. 2 is an enlarged cross sectional view taken on the line 2—2 in Fig. 1.

In accordance with the present invention I provide the improved implement which consists of two parts or jaws 8 and 9, one of the jaws being movable with respect to the other. The jaws are adapted to support the upper member 1 and at the same time hold the spring 3 in the retracted position shown in Fig. 1. One part 8 of the improved implement is formed with a recess 10 adapted to receive the spring 3; such recess being arranged between a pair of curved lips 11 and 12 shaped to conform to the curvature of the member 1 of the handpiece. The recess 10, as clearly shown in Figs. 1 and 2, extends transversely of the jaw or part 8 and opens through both sides thereof so that when the implement is in operative position the recess 10 lies with its open ends in the same direction with the slot 7. These lips 11 and 12, as shown to advantage in Fig. 2, are made to tightly embrace the wall of the member 1 in such position that the recess 10 will be in registry with the slot 7 and in a position to receive the spring 3 when the same is forced to the retracted position. The spring is forced back by a flat prong or angled end 13 projecting from and carried by the opposite part 9 of the implement, which is arranged to enter through the opposite elongated slot 6 and engage the spring 3 in the manner clearly shown in Figs. 1 and 2.

Figure 3:
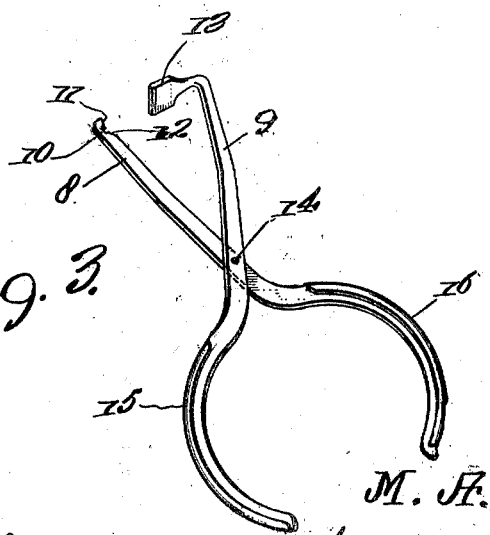
Fig. 3 is a perspective view of my improved implement.

Although the implement may take other forms, I find it convenient to make it up in the manner illustrated in Fig. 3 wherein the jaws 8 and 9 are crossed and pivoted as indicated at 14; such jaws being continued to the rear side of the pivot point where they are formed into the curved or other handles 15 and 16.

In use, after the handpiece has been disassembled and the washers added, the handpiece is re-united by first taking in hand the upper member 1 and engaging the parts of the improved implement therewith. This is done by first opening the jaws 8 and 9 by means of the handles 15 and 16 and bringing such jaws to a proper position whereat they may be closed in a way to cause the flattened prong 13 to enter through the slot 6 and the opposite jaw 8 to engage against the outer part of the member 1 in substantially the position shown in Figs. 1 and 2.

After being engaged in this manner the spring 3 is moved to the retracted position out of the path of the portion 5, and a single hand may be employed to hold the two handles 15 and 16 closed and which, by so doing, both supports the member 1 and holds the spring 3 retracted. The other hand is then free to grasp the lower member 2 of the handpiece, and the members may then be axially fitted together until the portion 5 of the member 2 has passed the lower crooked end of the spring 3, whereupon the implement may be removed to withdraw the prong 13 and the members 1 and 2 may thereafter be forced home.

It is obvious that those skilled in the art may vary the details of construction and arrangements of parts without departing from the spirit of my invention, and therefore I do not wish to be limited to such features except as may be required by the claim.

I claim:

A dental implement for use in assembling the parts of a dental handpiece of the usual cylindrical form, and containing the usual leaf spring, the said handpiece being slotted on opposite sides abreast said spring, said implement comprising two bars crossing each other and pivoted together, each of said bars being provided with a handle at one side of said pivot, and one of said bars being provided at its opposite end with an inwardly bent gripping arm adapted to project into one of the slots of the handpiece, and the opposite bar being provided with curved gripping faces adapted to fit the exterior of the handpiece, and with a transverse notch intermediate of said faces and adapted to receive said spring when pressed outward by the opposite gripping arm, substantially as described.

In testimony whereof, I affix my signature.

MURRELL A. STEVENS.